United States Patent
Park et al.

(10) Patent No.: US 10,873,104 B2
(45) Date of Patent: Dec. 22, 2020

(54) POSITIVE ELECTRODE ACTIVE MATERIALS FOR SECONDARY BATTERY AND SECONDARY BATTERY COMPRISING THE SAME

(71) Applicant: LG Chem, Ltd., Seoul (KR)

(72) Inventors: Sang Min Park, Daejeon (KR); Wang Mo Jung, Daejeon (KR); Byung Chun Park, Daejeon (KR); Ju Kyung Shin, Daejeon (KR); Ji Hoon Ryu, Daejeon (KR); Sang Wook Lee, Daejeon (KR)

(73) Assignee: LG Chem, Ltd.

( * ) Notice: Subject to any disclaimer, the term of this patent is extended or adjusted under 35 U.S.C. 154(b) by 187 days.

(21) Appl. No.: 15/760,071

(22) PCT Filed: Nov. 30, 2016

(86) PCT No.: PCT/KR2016/013965
§ 371 (c)(1),
(2) Date: Mar. 14, 2018

(87) PCT Pub. No.: WO2017/095139
PCT Pub. Date: Jun. 8, 2017

(65) Prior Publication Data
US 2018/0254511 A1  Sep. 6, 2018

(30) Foreign Application Priority Data

Nov. 30, 2015 (KR) .................. 10-2015-0168672
Nov. 29, 2016 (KR) .................. 10-2016-0160509

(51) Int. Cl.
*H01M 10/052* (2010.01)
*H01M 4/131* (2010.01)
(Continued)

(52) U.S. Cl.
CPC ........ *H01M 10/052* (2013.01); *C01G 53/006* (2013.01); *C01G 53/50* (2013.01);
(Continued)

(58) Field of Classification Search
CPC ..... C01G 53/006; C01G 53/50; H01M 4/525; H01M 4/131; H01M 4/505; H01M 2004/021
See application file for complete search history.

(56) References Cited

U.S. PATENT DOCUMENTS

2004/0200998 A1  10/2004  Park et al.
2004/0234857 A1  11/2004  Shiozaki et al.
(Continued)

FOREIGN PATENT DOCUMENTS

CN  101167209 A  4/2008
CN  101320807 A  12/2008
(Continued)

OTHER PUBLICATIONS

Extended European Search Report including Written Opinion for Application No. 16871035.8 dated Nov. 6, 2018, 8 pages.
(Continued)

*Primary Examiner* — Maria Laios
(74) *Attorney, Agent, or Firm* — Lerner, David, Littenberg, Krumholz & Mentlik, LLP

(57) ABSTRACT

The present invention provides a positive electrode active material for a secondary battery, the positive electrode active material being a secondary particle that includes a primary particle having a rectangular parallelepiped shape, the rectangular parallelepiped having at least one portion of vertices and edges formed in a round shape that is convex outward, wherein 1% to 40% of a total surface area of the secondary particle has open porosity, and the primary particle includes a lithium composite metal oxide of Formula 1 herein so that
(Continued)

intercalation and deintercalation of lithium are facilitated, elution of an active material-constituting metal element is suppressed, and excellent structural stability is exhibited, thereby decreasing resistance and improving output and lifespan characteristics when applied to a battery, and a secondary battery comprising the same.

18 Claims, 10 Drawing Sheets

(51) Int. Cl.
H01M 4/505 (2010.01)
C01G 53/00 (2006.01)
H01M 4/36 (2006.01)
H01M 4/1391 (2010.01)
H01M 4/525 (2010.01)
H01M 4/02 (2006.01)

(52) U.S. Cl.
CPC ......... *H01M 4/131* (2013.01); *H01M 4/1391* (2013.01); *H01M 4/364* (2013.01); *H01M 4/505* (2013.01); *H01M 4/525* (2013.01); *C01P 2002/50* (2013.01); *C01P 2004/03* (2013.01); *C01P 2004/51* (2013.01); *C01P 2006/11* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| 2009/0029253 | A1* | 1/2009 | Itou | H01M 10/0525 |
| | | | | 429/223 |
| 2013/0078520 | A1 | 3/2013 | Toya et al. | |
| 2013/0089787 | A1* | 4/2013 | Nagai | H01M 10/0525 |
| | | | | 429/223 |
| 2013/0149608 | A1 | 6/2013 | Kim et al. | |
| 2013/0189582 | A1 | 7/2013 | Lee | |
| 2013/0202946 | A1 | 8/2013 | Choy et al. | |
| 2013/0266868 | A1 | 10/2013 | Sun et al. | |
| 2013/0288129 | A1* | 10/2013 | Toya | H01M 4/362 |
| | | | | 429/223 |
| 2013/0323606 | A1 | 12/2013 | Yoshida et al. | |
| 2014/0158932 | A1 | 6/2014 | Sun et al. | |
| 2014/0170492 | A1 | 6/2014 | Xia et al. | |
| 2015/0004489 | A1 | 1/2015 | Song et al. | |
| 2015/0243978 | A1 | 8/2015 | Shon et al. | |
| 2016/0043396 | A1 | 2/2016 | Sakai et al. | |
| 2016/0049647 | A1 | 2/2016 | Park et al. | |
| 2016/0218350 | A1 | 7/2016 | Noh et al. | |
| 2018/0048015 | A1 | 2/2018 | Lee et al. | |
| 2018/0261842 | A1 | 9/2018 | Park et al. | |

FOREIGN PATENT DOCUMENTS

| CN | 102884659 A | | 1/2013 | |
| CN | 104241633 | * | 12/2014 | ........ H01M 10/0525 |
| EP | 3249723 A1 | | 11/2017 | |
| JP | 2012254889 A | | 12/2012 | |
| JP | 2013120752 A | | 6/2013 | |
| JP | 2015511373 A | | 4/2015 | |
| JP | 2015101525 A | | 6/2015 | |
| KR | 20010002211 A | | 1/2001 | |
| KR | 20030083476 A | | 10/2003 | |
| KR | 20110117359 A | | 10/2011 | |
| KR | 20120028071 A | | 3/2012 | |
| KR | 20120044651 A | | 5/2012 | |
| KR | 20130009739 A | | 1/2013 | |
| KR | 20130085323 A | | 7/2013 | |
| KR | 20130138073 A | | 12/2013 | |
| KR | 20140014289 A | | 2/2014 | |
| KR | 20150099219 A | | 8/2015 | |
| WO | 2003044881 A1 | | 5/2003 | |
| WO | 2012124240 A1 | | 9/2012 | |
| WO | 2014192758 A1 | | 12/2014 | |

OTHER PUBLICATIONS

PCT/KR2016/013965 International Search Report dated Mar. 9, 2017, 3 pages.
Chinese Search Report for Application No. 201680059225.1, dated Jun. 22, 2020, pp. 1-2.

* cited by examiner

POSITIVE ELECTRODE ACTIVE MATERIALS FOR SECONDARY BATTERY AND SECONDARY BATTERY COMPRISING THE SAME

CROSS-REFERENCE TO RELATED APPLICATION

The present application is a national phase entry under 35 U.S.C. § 371 of International Application No. PCT/KR2016/013965 filed Nov. 30, 2016, published in Korean, which claims priority from Korean Patent Application No. 10-2015-0168672, filed Nov. 30, 2015, and Korean Patent Application No. 10-2016-0160509, filed Nov. 29, 2016, in the Korean Intellectual Property Office, all of which are incorporated herein in their entirety by reference.

TECHNICAL FIELD

The present invention relates to a positive electrode active material for a secondary battery in which intercalation and deintercalation of lithium are facilitated, elution of an active material-constituting metal element is suppressed, and having excellent structural stability, thereby being capable of decreasing resistance and improving output and lifespan characteristics when applied to a battery, and a secondary battery including the same.

BACKGROUND ART

As technology development and demand for mobile devices increase, demand for secondary batteries as energy sources is sharply increasing. Among the secondary batteries, a lithium secondary battery that has high energy density and voltage, a long cycle lifespan, and a low self-discharge rate is commercialized and being widely used.

However, the lithium secondary battery has a problem in that its life sharply decreases as charge and discharge are repeated. Particularly, such a problem is more serious at high temperature. The decrease in a lifespan characteristic may occur due to decomposition of an electrolyte or deterioration of an active material due to moisture in the battery or other reasons. The decrease in the lifespan characteristic may also occur due to an increase in an internal resistance of a battery.

Accordingly, a positive electrode active material for a lithium secondary battery that is currently being vigorously researched, developed, and used is $LiCoO_2$ having a layered structure. Although $LiCoO_2$ is used the most due to its excellent lifespan characteristics and charge/discharge efficiency, there is a limitation for $LiCoO_2$ to be applied to a technology for increasing battery capacity due to its low structural stability.

As a positive electrode active material for substituting for $LiCoO_2$, various lithium transition metal oxides such as $LiNiO_2$, $LiMnO_2$, $LiMn_2O_4$, $LiFePO_4$ and $Li(Ni_{x1}Co_{y1}Mn_{z1})O_2$ have been developed. Among these, $LiNiO_2$ has an advantage of exhibiting a high discharge capacity as a battery characteristic but has problems in that synthesis is difficult with a simple solid state reaction and thermal stability and a cycle characteristic are low. Also, lithium-manganese-based oxides such as $LiMnO_2$ and $LiMn_2O_4$ have advantages including excellent thermal stability and low cost but has problems including low capacity and low high-temperature characteristics. Particularly, $LiMn_2O_4$ is commercialized in some low-cost products but has an inferior lifespan characteristic due to structural deformation (Jahn-Teller distortion) caused by $Mn^{3+}$. Also, although a large amount of research is currently being carried out on $LiFePO_4$ for use in hybrid electric vehicles (HEVs) due to low cost and excellent stability, it is difficult for $LiFePO_4$ to be applied to other fields due to low conductivity.

Due to such circumstances, a material that is currently being spotlighted the most as a positive electrode active material for substituting for $LiCoO_2$ is a lithium-nickel-manganese-cobalt-based oxide including a high content of lithium, that is, $Li_{a1}(Ni_{x2}Co_{y2}Mn_{z2})_{2-a2}O_2$ (here, a1, x2, y2, and z2 are atomic fractions of independent oxide-forming elements, and $1<a1\le1.5$, $0<x2\le1$, $0<y2\le1$, $0<z2\le1$, and $0<x2+y2+z2\le1$).

This material has advantages in that the material is less expensive than $LiCoO_2$ and can be used at high capacity and high voltage but has disadvantages in that a rate capability and lifespan characteristic at high temperature are inferior.

Accordingly, a method of manufacturing a positive electrode active material capable of improving the performance of a lithium secondary battery by controlling a composition change or a crystal structure in a lithium transition metal oxide is required.

DISCLOSURE

Technical Problem

A first technical object of the present invention is to provide a positive electrode active material for a secondary battery in which intercalation and deintercalation of lithium are facilitated, elution of an active material-constituting metal element is suppressed, and having excellent structural stability, thereby being capable of decreasing resistance and improving output and lifespan characteristics when applied to a battery, and a method of manufacturing the same.

A second technical object of the present invention is to provide a positive electrode for a secondary battery, a lithium secondary battery, a battery module, and a battery pack including the positive electrode active material.

A third technical object of the present invention is to provide a precursor that is useful in manufacturing the positive electrode active material.

Technical Solution

To achieve the above objects, according to an embodiment of the present invention, there is provided a positive electrode active material for a secondary battery, the positive electrode active material being a secondary particle that includes a primary particle having a rectangular parallelepiped shape, the rectangular parallelepiped having at least one portion of vertices and edges formed in a round shape that is convex outward, wherein 1% to 40% of a total surface area of the secondary particle has open porosity, and the primary particle includes a lithium composite metal oxide of Formula 1 below.

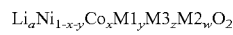  [Formula 1]

(In Formula 1, M1 is at least one selected from the group consisting of Al and Mn, M2 is any one or two or more elements selected from the group consisting of Zr, Ti, Mg, Ta, and Nb, M3 is any one or two or more elements selected from the group consisting of W, Mo, and Cr, and $1.0\le a\le1.5$, $0<x\le0.5$, $0<y\le0.5$, $0.002\le z\le0.03$, $0\le w\le0.02$, $0<x+y\le0.7$)

According to another embodiment of the present invention, there is provided a method of manufacturing the above-described positive electrode active material for a secondary battery, the method including a step of preparing a needle-shaped precursor by adding an ammonium cation-containing complexing agent and a basic compound to a metal-containing solution, which is produced by mixing a nickel raw material, a cobalt raw material, and an M1 raw material (here, M1 is at least one element selected from the group consisting of Al and Mn), and causing a reaction at pH 9 to 11, and a step of mixing the needle-shaped precursor with a lithium raw material and then sintering at 700° C. to 900° C., wherein an M3 raw material (here, M3 is any one or two or more elements selected from the group consisting of W, Mo, and Cr) is further added when producing the metal-containing solution or mixing the needle-shaped precursor with the lithium raw material.

According to still another embodiment of the present invention, there is provided a positive electrode for a secondary battery, a lithium secondary battery, a battery module, and a battery pack including the positive electrode active material.

According to another embodiment of the present invention, there is provided a precursor of the above-described positive electrode active material for a secondary battery, the precursor being a secondary particle including a primary particle, wherein the primary particle includes a compound of Formula 2 below and has a needle shape.

$$Ni_{1-x-y}Co_xM1_yM3_zM2_wA \qquad \text{[Formula 2]}$$

(In Formula 2, A is a hydroxy group or an oxyhydroxy group, M1 is at least one selected from the group consisting of Al and Mn, M2 is any one or two or more elements selected from the group consisting of Zr, Ti, Mg, Ta, and Nb, M3 is any one or two or more elements selected from the group consisting of W, Mo, and Cr, and $0<x\leq0.5$, $0<y\leq0.5$, $0.002\leq z\leq0.03$, $0\leq w\leq0.02$, $0<x+y\leq0.7$) Other details of the embodiments of the present invention are included in the detailed description below.

Advantageous Effects

According to the present invention, a positive electrode active material for a secondary battery can facilitate intercalation and deintercalation of lithium due to its unique structure, can suppress elution of an active material-constituting metal element, and can exhibit excellent structural stability. As a result, resistance can be decreased and output and lifespan characteristics can be improved when applied to a battery. Also, the distribution of metal elements in the positive electrode active material can be further controlled, and as a result, thermal stability can be improved, and performance deterioration at high voltage can be minimized.

DESCRIPTION OF DRAWINGS

Because the following drawings attached to the present specification illustrate exemplary embodiments of the present invention and serve to facilitate understanding of the technical idea of the present invention together with the above-described content of the invention, the present invention should not be limitedly interpreted on the basis of the drawings.

BEST MODE

Figure 1:
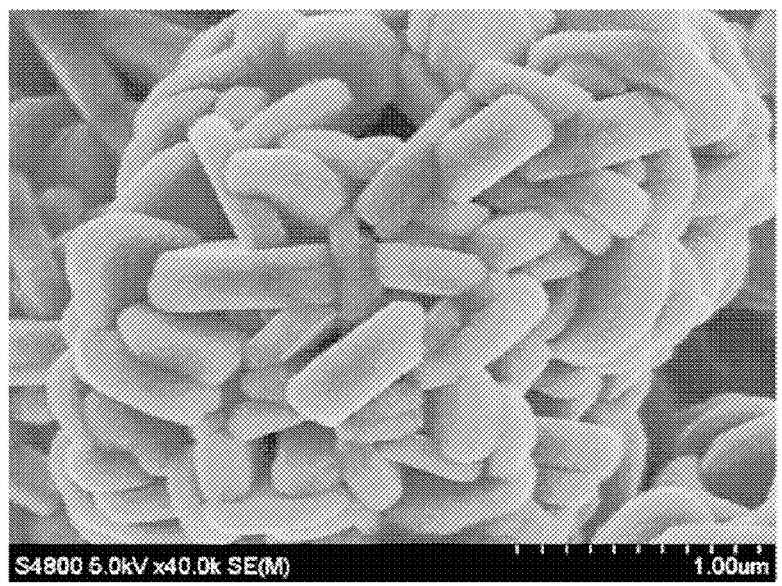
FIG. 1 is a photograph of a positive electrode active material of Example 1 observed with a scanning electron microscope (SEM).

Hereinafter, the present invention will be described in more detail to assist understanding of the present invention.

Terms or words used in the present specification and claims are not to be limitedly interpreted as general or dictionary meanings and should be interpreted as meanings and concepts that are consistent with the technical idea of the present invention on the basis of the principle that an inventor may properly define concepts of terms to describe his or her invention in the best way.

According to an embodiment of the present invention, a positive electrode active material for a secondary battery is a secondary particle that includes a primary particle having a rectangular parallelepiped shape, the rectangular parallelepiped having at least one portion of vertices and edges formed in a round shape that is convex outward, wherein 1% to 40% of a total surface area of the secondary particle has open porosity, and the primary particle includes a lithium composite metal oxide of Formula 1 below:

$$Li_aNi_{1-x-y}Co_xM1_yM3_zM2_wO_2 \qquad \text{[Formula 1]}$$

In Formula 1, M1 is at least one selected from the group consisting of Al and Mn, M2 is any one or two or more elements selected from the group consisting of Zr, Ti, Mg, Ta, and Nb, M3 is any one or two or more elements selected from the group consisting of W, Mo, and Cr, and $1.0\leq a\leq1.5$, $0<x\leq0.5$, $0<y\leq0.5$, $0.002\leq z\leq0.03$, $0\leq w\leq0.02$, $0<x+y\leq0.7$.

In the present invention, an outside of the primary particle is a concept opposite to an inside toward a center of the particle and refers to an outward direction toward a surface side or an outside of a surface of the particle. The composition of the lithium composite metal oxide of Formula 1 above is an average composition of an entire positive electrode active material particle.

More specifically, in Formula 1, M3 is an element corresponding to Group 6 (group VIB) of the periodic table and serves to suppress particle growth during a sintering process when manufacturing the active material particle. In a crystal structure of the positive electrode active material, M3 may substitute for some of Ni, Co, or M1 and be present at a position at which Ni, Co, or M1 should be present or may react with lithium and form a lithium oxide. Accordingly, the form and size of the positive electrode active material particle may be controlled by adjusting a content and an input timing of M3. Specifically, M3 may be any one or two or more elements selected from the group consisting of W, Mo, and Cr, and more specifically, may be any one element of W and Cr. Among these, M3 may be excellent in terms of rate capability and output characteristic when M3 is W, and M3 may be superior in terms of a room temperature lifespan characteristic when M3 is Cr.

M3 may be included at a content corresponding to z, that is, $0.002 \leq z \leq 0.03$, of the lithium composite metal oxide of Formula 1 above. When z is less than 0.002 or exceeds 0.03, it may not be easy to realize an active material that satisfies the above-mentioned characteristics, and as a result, the effect of improving output and lifespan characteristics may be insignificant. In consideration of realizing a particle structure in accordance with control of a content of the element M3 and the remarkableness of the effect of improving a battery characteristic as a result thereof, M3 may be included at a content of, more specifically, $0.005 \leq z \leq 0.01$.

In the lithium composite metal oxide of Formula 1 above, Li may be included at a content corresponding to a, that is, $1.0 \leq a \leq 1.5$. When a is less than 1.0, there is a concern that the capacity may be deteriorated, and when a exceeds 1.5, the particle is sintered in a sintering process and it may be difficult to manufacture an active material. In consideration of the balance between the remarkableness of the effect of improving a capacity characteristic of a positive electrode active material in accordance with control of Li content and sinterability when manufacturing the active material, Li may be included at a content of, more specifically, $1.0 \leq a \leq 1.15$.

Also, in the lithium composite metal oxide of Formula 1 above, Co may be included at a content corresponding to x, that is, a content of $0 < x \leq 0.5$. When x is 0, there is a concern that the capacity characteristic may be deteriorated, and when x exceeds 0.5, there is a concern that cost may be increased. In consideration of remarkableness of the effect of improving a capacity characteristic in accordance with including Co, Co may be included at a content of, more specifically, $0.10 \leq x < 0.35$.

Further, in the lithium composite metal oxide of Formula 1 above, M1 may be at least one selected from the group consisting of Al and Mn. When M1 is Al, a surface property of an active material may be improved, and thus an output effect of a battery may be improved. When M1 is Mn, structural stability of the active material may be improved, and thus a lifespan characteristic of a battery may be improved.

M1 may be included at a content corresponding to y, that is, a content of $0 < y \leq 0.5$. When y is 0, an improvement effect in accordance with including M1 is unable to be obtained, and when y exceeds 0.5, there is a concern that an output characteristic and a capacity characteristic of a battery may rather be deteriorated. In consideration of the remarkableness of the effect of improving a battery characteristic in accordance with including the element M1, M1 may be included at a content of, more specifically, $0.1 < y \leq 0.3$.

Further, the lithium composite metal oxide of Formula 1 above or the elements Ni, Co, and M1 in the lithium composite metal oxide may be partially substituted or doped with another element, i.e., M2, to improve a battery characteristic by controlling a distribution of metal elements within the active material. Specifically, M2 may be any one or two or more elements selected from the group consisting of Zr, Ti, Mg, Ta, and Nb, and more specifically, may be Ti or Mg.

The element M2 may be included in an amount corresponding to w within a range not deteriorating characteristics of the positive electrode active material, that is, a content of $0 \leq w \leq 0.02$.

The positive electrode active material according to an embodiment of the present invention is a secondary particle in which primary particles including the lithium composite metal oxide of Formula 1 are entangled and may exhibit an excellent output characteristic.

By controlling contents, input timings, and heat-treating conditions of the elements M1, M2, and M3 in a manufacturing process, the positive electrode active material may include a primary particle having a rectangular parallelepiped shape, the rectangular parallelepiped having at least one portion of vertices and edges formed in a round shape that is convex outward.

Due to the primary particle having such a unique shape, intercalation and deintercalation of lithium ions are facilitated in the positive electrode active material, and because lithium ions are able to move at a high speed even in the primary particle, the positive electrode active material may exhibit a further improved output characteristic when applied to a battery. Also, by a vertex or edge portion having the round shape that is convex outward, elution of metal elements, in particular, Mn, included in the lithium composite metal oxide may be prevented. Generally, Mn is easily eluted at a vertex or edge portion of a particle. According to the present invention, by manufacturing such a portion of the particle in the round shape, elution of the metal element may be reduced, and as a result, stability and a lifespan characteristic when applied to a battery, in particular, a lifespan characteristic at high temperature, of the active material may be improved.

Specifically, the primary particle may have a rectangular parallelepiped shape in which at least one vertex portion of vertices of the rectangular parallelepiped has a round shape that is convex outward, and a cross-section of the primary particle may be rectangular when the particle is cut such that the rectangular parallelepiped includes a long axis that is parallel to two surfaces of the rectangular parallelepiped facing each other and passes through a center of the particle.

An aspect ratio of the primary particle (=a length of the long axis/a length of a short axis), which is a ratio between a length of the long axis passing through the center of the primary particle and a length of a short axis orthogonal to the long axis and passing through the center of the primary particle, may be 1.5 to 10. When the aspect ratio of the primary particle is less than 1.5 or exceeds 10, a change in volume of the primary particle is biased toward only one of the long axis and the short axis during intercalation and deintercalation of lithium such that bonding between primary particles is weakened, and there are concerns about deterioration of the structural stability of the active material particle and deterioration of a cycle characteristic when applied to a battery.

When the primary particle realizing the above-described shape and aspect ratio has a specific orientation or a content of the primary particle having a specific orientation is too high, for example, when the primary particle has an orientation in a central direction of the secondary particle, a change in volume in an axial direction of the primary particle becomes difficult during intercalation and deintercalation of lithium, and as a result, there are concerns about deterioration of contact between primary particles and fragmentation of the secondary particle. Consequently, in the positive electrode active material according to an embodiment of the present invention, less than 50%, more specifically, equal to or less than 20%, and even more specifically, equal to or less than 10% of the primary particles may be oriented in the central direction of the secondary particle. Preferably, the primary particle is entangled without having a specific orientation when assembled into the secondary particle.

The positive electrode active material according to an embodiment of the present invention that is formed by assembling the primary particles that realize the above-described physical properties may have open porosity in 1 to 40%, specifically, 10 to 30%, and more specifically, 15 to 30% of a total surface area of the secondary particle. When the open porosity of the secondary particle exceeds 40%, a contact portion between abutting primary particles decreases when the primary particles contract or expand due to an electrode reaction during charge/discharge, and thus there is a concern that internal resistance may increase. When the open porosity of the secondary particle is less than 1%, a sufficient expansion space required when the primary particle expands due to an electrode reaction during charge/discharge is unable to be secured, and as a result, there is a concern that fragmentation of the secondary particle may occur. The positive electrode active material according to an embodiment of the present invention simultaneously satisfies the above-described shape and aspect ratio of the primary particle and the open porosity of the secondary particle, thereby exhibiting excellent capacity and charge/discharge characteristics.

In the present invention, an open pore refers to a pore having an open structure connected to a particle surface unlike a closed pore that is isolated from the particle surface. The open porosity may be measured by cross-sectional analysis of a particle using focused ion beam (FIB) or a mercury press-fitting method. Specifically, when the FIB is used, the secondary particle may be cut using the FIB, a cross-sectional image may be acquired by the SEM, the acquired cross-sectional image may be divided into a spatial portion and a material portion by computer image processing, and the open porosity may be obtained using Equation 1 below.

Open porosity=(Surface area of open pore portion/Surface area of secondary particle)×100     [Equation 1]

By controlling a sintering temperature and sintering time in the manufacturing process, the positive electrode active material according to an embodiment of the present invention may further include a hollow inside the secondary particle.

In this way, when the hollow is further included inside the secondary particle, the hollow may serve to absorb an impact during rolling for manufacturing an electrode, and an electrolyte is easily penetrated into the active material such that a reaction area with the electrolyte of the active material may be increased. As a result, an output characteristic and a lifespan characteristic of a secondary battery may be even more improved. Specifically, in the secondary particle, a hollow region determined according to Equation 2 below may be 0.2 to 1.

Hollow region=(Radius of secondary particle−Radius of hollow)/Radius of secondary particle     [Equation 2]

The hollow may be included at up to 30 vol %, specifically, 2 to 30 vol %, of the total volume of the positive electrode active material. When the hollow is included within the above range, an excellent impact-absorbing effect and an effect of increasing a reaction area with an electrolyte may be exhibited without deterioration of a mechanical strength of the active material. In consideration of the remarkableness of an improvement effect in accordance with the hollow formation, the hollow may be included at, more specifically, 5 to 20 vol % of the total volume of the positive electrode active material. Here, the hollow region inside the secondary particle and the volume of the hollow may be measured by cross-sectional analysis of a particle using FIB or a mercury press-fitting method.

The positive electrode active material according to an embodiment of the present invention may have an average particle size ($D_{50}$) of 2 μm to 20 μm and a Brunauer-Emmett-Teller (BET) specific surface area of 0.5 $m^2$/g to 1.9 $m^2$/g.

When the average particle size of the positive electrode active material is less than 2 μm or the BET specific surface area exceeds 1.9 $m^2$/g, there is concern of deterioration of dispersibility of positive electrode active materials in the active material layer due to condensation between the positive electrode active materials and an increase of resistance in an electrode. When the average particle size exceeds 20 μm or the BET specific surface area is less than 0.5 $m^2$/g, there is concern of deterioration of dispersibility of the positive electrode active material itself and deterioration of capacity. The positive electrode active material according to an embodiment of the present invention has the above-described unique structure and simultaneously satisfies the conditions of the average particle size and the BET specific surface area, thereby exhibiting superior capacity and charge/discharge characteristics. More specifically, the positive electrode active material may have an average particle size ($D_{50}$) of 3 μm to 15 μm and a BET specific surface area of 0.65 $m^2$/g to 1.5 $m^2$/g.

In the present invention, the average particle size ($D_{50}$) of the positive electrode active material may be defined as particle size based on a particle size distribution at 50%. In the present invention, the average particle size ($D_{50}$) of the positive electrode active material may be measured using electron microscopy observation using scanning electron microscopy (SEM), field emission scanning electron microscopy (FE-SEM), or the like or using a laser diffraction method. For example, when the positive electrode active material is measured by a laser diffraction, the positive electrode active material particle may be dispersed in a dispersion medium, the dispersed positive electrode active material particle may be introduced into a commercially available laser diffraction particle size measurement device (for example, Microtrac MT 3000), and then an ultrasonic wave of about 28 kHz may be radiated with an output of 60 W to calculate the average particle size ($D_{50}$) based on a particle size distribution at 50% in the measurement device.

In the present invention, the specific surface area of the positive electrode active material is measured using a BET method. Specifically, the specific surface area may be calculated from a nitrogen gas absorption amount under a liquid nitrogen temperature (77K) using BELSORP-mini II of BEL Japan company.

The positive electrode active material according to an embodiment of the present invention may have a tap density equal to or higher than 1.7 g/cc or 1.7 g/cc to 2.5 g/cc. By having a high tap density in the above range, a high capacity characteristic can be exhibited In the present invention, the tap density of the positive electrode active material may be measured using a general tap density measuring device, and specifically, may be measured using Tap-2S of Logan company.

In the positive electrode active material according to an embodiment of the present invention, at least one metal element of nickel, M1, and cobalt included in the lithium composite metal oxide of Formula 1 above may exhibit a concentration gradient that increases or decreases in the active material particle.

In the present invention, a concentration gradient or a concentration profile of a metal element refers to a graph showing a content of a metal element within a depth from a particle surface to a central portion when the x-axis indicates the depth from the particle surface to the central portion and the y-axis indicates a content of a metal element. For example, a positive average slope of a concentration profile signifies that a relatively larger amount of a corresponding metal element is disposed at a particle central portion section than at a particle surface portion. A negative average slope thereof signifies that a relatively larger amount of a metal element is disposed at a particle surface portion than at the particle central portion section. According to the present invention, a concentration gradient and a concentration profile of a metal in the active material may be confirmed using methods such as x-ray photoelectron spectroscopy (XPS) (also referred to as electron spectroscopy for chemical analysis (ESCA)), an electron probe micro analyzer (EPMA), an inductively coupled plasma-atomic emission spectrometer (ICP-AES), or time-of-flight secondary ion mass spectrometry (ToF-SIMS), and specifically, when a profile of a metal element in the active material is confirmed using the XPS, an atomic ratio of a metal may be measured for each etching time while etching the active material in a direction from a particle surface toward a central portion, and a concentration profile of the metal element may be confirmed from this.

Specifically, in the positive electrode active material according to an embodiment of the present invention, at least one metal element of nickel, cobalt, and M1 may have a concentration gradient in which the concentration of the metal gradually changes throughout the active material particle, and the slope of the concentration gradient of the metal element may exhibit one or more values. By having a gradual concentration gradient in this way, because a sharp phase boundary region is not present from the center to the surface, a crystal structure is stabilized, and thermal stability is increased. When the slope of the concentration gradient of a metal is constant, the effect of improving structural stability may be further improved. Also, by varying a concentration of each of the metals within the active material particle by a concentration gradient, characteristics of a corresponding metal can be easily utilized to further improve the effect of the positive electrode active material improving battery performance.

In the present invention, "a concentration of a metal exhibits a gradually-changing concentration gradient" means that a concentration of a metal does not have a sharp concentration change, i.e., a sharp concentration difference, throughout an entire particle and is present at a gradually or continuously changing concentration distribution. Specifically, in the concentration distribution, a change in metal concentration per 1 µm, more specifically, 0.1 µm in a particle may be a difference of 0.1 atom % to 30 atom %, more specifically, 0.1 atom % to 20 atom %, and even more specifically, 1 atom % to 10 atom %, based on a total atomic weight of a corresponding metal included in the active material particle.

More specifically, in the positive electrode active material, a concentration of nickel included in the active material may decrease with a gradual concentration gradient in a direction from a center of the active material particle toward a surface of the particle. Here, a slope of the concentration gradient of nickel may be constant from the center of the active material particle toward the surface. In this way, when the concentration of nickel remains high at the particle center in the active material particle and the concentration of nickel includes a concentration gradient that gradually decreases toward the surface of the particle, thermal stability of the positive electrode active material may be improved.

In the positive electrode active material, a concentration of M1 included in the active material may increase with a gradual concentration gradient in a direction from the center of the active material particle toward the surface of the particle. Here, a slope of the concentration gradient of M1 may be constant from the center of the active material particle toward the surface. In this way, when the concentration of M1, in particular, manganese, remains low at the particle center in the active material particle and the concentration of M1 includes a concentration gradient that gradually increases toward the surface of the particle, thermal stability of the positive electrode active material may be improved without a decrease in capacity of the positive electrode active material. More specifically, the M1 may be Mn.

In the positive electrode active material, a concentration of cobalt included in the active material may increase with a gradual concentration gradient in a direction from the center of the active material particle toward the surface of the particle. Here, a slope of the concentration gradient of the active material may be constant from the center of the active material particle toward the surface. In this way, when the concentration of cobalt remains low at the particle center in the active material particle and the concentration of cobalt includes a concentration gradient that gradually increases toward the surface, a capacity characteristic of the positive electrode active material may be improved while reducing a use amount of cobalt.

In the active material, nickel, M1, and cobalt, may exhibit a concentration gradient that each independently changes throughout the active material particle, the concentration of nickel may decrease with a gradual concentration gradient in the direction from the center of the active material particle toward the surface thereof, and the concentrations of cobalt and M1 may independently increase with a gradual concentration gradient in the direction from the center of the active material particle toward the surface thereof. In this way, by including a combined concentration gradient, in which the concentration of nickel decreases and the concentrations of cobalt and M1 increase toward the surface of the active material particle throughout the active material, thermal stability may be improved while a capacity characteristic of the positive electrode active material is maintained.

The positive electrode active material according to an embodiment of the present invention having the above-described structure and physical properties may be manufactured by a manufacturing method that includes a step of preparing a needle-shaped precursor by adding an ammonium cation-containing complexing agent and a basic compound to a metal-containing solution, which is produced by mixing a nickel raw material, a cobalt raw material, and an M1 raw material (here, M1 is at least one element selected from the group consisting of Al and Mn), and causing a reaction at pH 9 to 11 (Step 1); and a step of mixing the needle-shaped precursor with a lithium raw material and then sintering at 700° C. to 900° C. (Step 2), wherein an M3 raw material (here, M3 is any one or two or more elements selected from the group consisting of W, Mo, and Cr) is further added when producing the metal-containing aqueous solution or mixing the needle-shaped precursor with the lithium raw material. When the positive electrode active material further includes M2 (here, M2 is any one or two or more elements selected from the group consisting of Zr, Ti, Mg, Ta, and Nb), an M2 raw material may be added when mixing the raw materials of the metal elements in Step 1, or the M2 raw material may be added when mixing the needle-shaped precursor with the lithium raw material in Step 2. Accordingly, according to another embodiment of the present invention, a method of manufacturing the above-described positive electrode active material is provided.

Hereinafter, each of the steps will be described in detail. In the method for manufacturing the positive electrode active material, Step 1 is a step of preparing a precursor by using the nickel raw material, the cobalt raw material, the M1 raw material and selectively using the M3 or M2 raw material.

Specifically, the precursor may be manufactured by adding the ammonium cation-containing complexing agent and the basic compound to the metal-containing solution (hereinafter, simply referred to as "first metal-containing solution"), which is manufactured by mixing the nickel raw material, the cobalt raw material, the M1 raw material, and selectively, the M3 or M2 raw material, and causing a coprecipitation reaction. Here, a mixing ratio of the raw materials may be properly determined within the range that allows the conditions of contents of the metal elements in the finally manufactured positive electrode active material to be satisfied.

The first metal-containing solution may be produced by adding the nickel raw material, the cobalt raw material, the M1-containing raw material, and selectively, the M3 or M2-containing raw material to a solvent, specifically, water or a mixture of water and an organic solvent (specifically, an alcohol or the like) that may be uniformly mixed with water. Alternatively, solutions, specifically, aqueous solutions, including each of the metal-containing raw material may be produced, the solutions may be mixed, and then the mixture may be used as the first metal-containing solution.

An acetate, a nitrate, a sulfate, a halide, a sulfide, a hydroxide, an oxide, an oxyhydroxide, or the like may be used as the metal-containing raw material, and the metal-containing raw material is not particularly limited as long as the metal-containing raw material can be dissolved in water.

For example, examples of the cobalt raw material may include $Co(OH)_2$, $CoOOH$, $Co(SO_4)_2$, $Co(OCOCH_3)_2 \cdot 4H_2O$, $Co(NO_3)_2 \cdot 6H_2O$, $Co(SO_4)_2 \cdot 7H_2O$, or the like, and any one of the above or a mixture of two or more of the above may be used as the cobalt raw material.

Examples of the nickel raw material may include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salts, nickel halides, or the like, and any one of the above or a mixture of two or more of the above may be used as the nickel raw material.

Examples of the manganese raw material may include manganese oxides such as $Mn_2O_3$, $MnO_2$, and $Mn_3O_4$; manganese salts such as $MnCO_3$, $Mn(NO_3)_2$, $MnSO_4$, manganese acetate, manganese dicarboxylate, manganese citrate, and fatty acid manganese salts; an oxyhydroxide, manganese chloride, and the like, and any one of the above or a mixture of two or more of the above may be used as the manganese raw material.

Examples of an aluminum raw material may include $AlSO_4$, $AlCl$, $AlNO_3$, or the like, and any one of the above or a mixture of two or more of the above may be used as the aluminum raw material.

An acetate, a nitrate, a sulfate, a halide, a sulfide, a hydroxide, an oxide, an oxyhydroxide, or the like including the element M3 may be used as the M3 raw material. For example, when M3 is W, a tungsten oxide may be used. The M3 raw material may be used within the range that allows a condition of a content of the element M3 in the finally manufactured positive electrode active material to be satisfied.

The ammonium cation-containing complexing agent may be, specifically, $NH_4OH$, $(NH_4)_2SO_4$, $NH_4NO_3$, $NH_4Cl$, $CH_3COONH_4$, $NH_4CO_3$, or the like, and any one of the above or a mixture of two or more of the above may be used as the ammonium cation-containing complexing agent. Further, the ammonium cation-containing complexing agent may also be used in the form of an aqueous solution, and here, water or a mixture of water and an organic solvent (specifically, an alcohol or the like) that may be uniformly mixed with water may be used as a solvent.

The ammonium cation-containing complexing agent may be added in an amount such that the molar ratio is 0.5 to 1 with respect to 1 mole of the first metal-containing solution. Generally, a chelating agent reacts with a metal at a molar ratio of 1:1 or higher to form a complex. However, because an unreacted complex that has not reacted with the basic aqueous solution in the formed complex may be changed into an intermediate product and be recovered as a chelating agent for reuse, the use amount of chelating agent may be lowered in the present invention in comparison to the general case. As a result, the crystallinity of the positive electrode active material may be improved, and the positive electrode active material may be stabilized.

The basic compound may be a hydroxide of an alkali metal or an alkaline earth metal such as NaOH, KOH, $Ca(OH)_2$, or the like or a hydrate thereof, and any one of the above or a mixture of two or more of the above may be used as the basic compound. The basic compound may also be used in the form of an aqueous solution, and here, water or a mixture of water and an organic solvent (specifically, an alcohol or the like) that may be uniformly mixed with water may be used as a solvent.

The coprecipitation reaction may be performed under a condition in which pH is 9 to 11. When the pH is within the above range, a needle-shaped precursor may be formed. When the pH deviates from the above range, there is a concern that the shape of the manufactured precursor may be changed or particle fragmentation may be caused. Also, there is a concern that metal ions may be eluted at a surface of the precursor and form various oxides by side reaction. More specifically, the coprecipitation reaction may be performed under a condition in which the pH is 9 to 10.5.

The ammonium cation-containing complexing agent and the basic compound may be used in a molar ratio of 1:10 to 1:2 to satisfy the above-mentioned pH range. Here, the pH value refers to a pH value of a liquid at a temperature of 25° C.

The coprecipitation reaction may be performed at a temperature of 40° C. to 70° C. under an inert atmosphere of nitrogen or the like. Further, a stirring process may be selectively performed to increase a reaction speed during the reaction, and here, the stirring speed may be 100 rpm to 2,000 rpm.

When a concentration gradient of a metal element in the finally manufactured positive electrode active material is attempted to be formed, a second metal-containing solution including nickel, cobalt, M1-containing metal salt and, selectively, M2-containing metal salt in different concentrations from the first metal-containing solution may be prepared, then, simultaneously, the second metal-containing solution may be added to the first metal-containing solution such that a mixing ratio of the first metal-containing solution and the second-metal containing solution is gradually changed from 100 vol %:0 vol % to 0 vol %:100 vol %, and the ammonium cation-containing complexing agent and the basic compound may be added thereto, and a reaction may be caused, thereby forming the concentration gradient.

In this way, when a reaction speed and reaction time are controlled by gradually increasing an amount of the second metal-containing solution being input into the first metal-containing solution, a composite metal hydroxide or oxyhydroxide that exhibits a concentration gradient in which concentrations of nickel, cobalt, and M1 independently gradually change from the center of the particle toward a surface thereof may be manufactured with a single coprecipitation reaction process. In this case, the concentration gradient of a metal in the resulting composite metal hydroxide or oxyhydroxide and a slope of the concentration gradient may be easily adjusted by compositions and mixing supply ratios of the first metal-containing solution and the second metal-containing solution. Extending a reaction time and decreasing a reaction speed are preferable to reach a high density state in which a concentration of a specific metal is high, and shortening a reaction time and increasing a reaction speed are preferable to reach a low density state in which a concentration of a specific metal is low.

Specifically, the second metal-containing solution may be added to the first metal-containing solution such that a speed of adding the second metal-containing solution is gradually increased within the range of 1% to 30% of an initial input speed. Specifically, an input speed of the first metal-containing solution may be 150 ml/hr to 210 ml/hr, an input speed of the second metal-containing solution may be 120 ml/hr to 180 ml/hr, and the input speed of the second metal-containing solution may be gradually increased within the range of 1% to 30% of the initial input speed within the input speed range. Here, the reaction may be performed at 40° C. to 70° C. Also, a size of a precursor particle may be adjusted by adjusting a supply amount and reaction time of the second metal-containing solution with respect to the first metal-containing solution.

By the above process, a particle of a composite metal hydroxide or oxyhydroxide is generated and precipitated in a reaction solution as a precursor. Specifically, the precursor may include a compound of Formula 2 below and may have a needle shape. Inducing the shape of the precursor to be a needle shape may be possible by pH control during a reaction, and a size and orientation of the needle shape may be controlled by selecting a pH range in which a particle growth of the composite metal oxide may be induced and adjusting time.

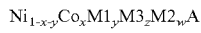

$$Ni_{1-x-y}Co_xM1_yM3_zM2_wA \quad \text{[Formula 2]}$$

(In Formula 2, M1, M2, M3, x, y, z, and w are the same as those defined above, and A is a hydroxyl group or oxyhydroxy group)

The precipitated precursor may be separated in accordance with a general method, and then a drying process may be selectively performed.

The drying process may be performed in accordance with a general drying method and, specifically, may be performed for 15 to 30 hours using a method such as heat treatment and hot air injection in the temperature range of 100° C. to 200° C.

In the method for manufacturing the positive electrode active material, Step 2 is a step of manufacturing the positive electrode active material by mixing the precursor particle prepared in Step 1 with the lithium raw material and selectively with the M3 or M2 raw material and then sintering. Here, the M3 and M2 raw materials are the same as those described above.

Examples of the lithium raw material may include a lithium-containing carbonate (for example, lithium carbonate or the like), a hydrate (for example, lithium hydroxide I hydrate (LiOH.H$_2$O) or the like), a hydroxide (for example, lithium hydroxide or the like), a nitrate (for example, lithium nitrate (LiNO$_3$) or the like), and a chloride (for example, lithium chloride (LiCl) or the like), and any one of the above or a mixture of two or more of the above may be used as the lithium raw material. A use amount of the lithium-containing raw material may be determined in accordance with contents of lithium and a metal element (Me) other than lithium in the finally prepared lithium composite metal oxide, and specifically, the lithium-containing raw material may be used in an amount such that the molar ratio between lithium included in the lithium raw material and the metal element (Me) included in the composite metal hydroxide (molar ratio of lithium/metal element (Me)) is 1.0 or higher.

After the precursor is mixed with the lithium-containing raw material and selectively with the M2 raw material, a preliminary heat treatment process at 250° C. to 500° C. may be selectively performed before the sintering process. By such a preliminary heat treatment process, a sintering rate during the subsequent sintering process may be increased.

The preliminary heat treatment process may be performed in one step or may also be performed in multiple steps at different temperatures.

The sintering process may be performed at 700° C. to 900° C. or 750° C. to 850° C.

The shape, size, aspect ratio, and orientation of the primary particle may be controlled by adjusting temperature during the sintering process, and the positive electrode active material having the above-described structure may be manufactured by performing the sintering process in the above temperature ranges. The sintering process may also be performed in multiple steps of two to three.

The sintering process may be performed in an air atmosphere or an oxygen atmosphere (for example, O$_2$ or the like), and more specifically, may be performed under an oxygen atmosphere at an oxygen partial pressure of 20 vol % or higher. The sintering process may be performed for 5 hours to 48 hours or for 10 hours to 20 hours under the above conditions.

A sintering aid may be selectively further added during the sintering process.

When the sintering aid is added, crystals may be easily grown at low temperature, and non-uniform reaction may be minimized during dry mixing. Also, the sintering aid has an effect of dulling an edge portion of the primary particle of the lithium composite metal oxide and forming the primary particle into a particle having a round curved shape.

Specifically, examples of the sintering aid may include boron compounds such as boric acid, lithium tetraborate, boron oxide, and ammonium borate; cobalt compounds such as cobalt oxide (II), cobalt oxide (III), cobalt oxide (IV), and tricobalt tetraoxide; vanadium compounds such as vanadium oxide; lanthanum compounds such as lanthanum oxide; zirconium compounds such as zirconium boride, calcium silicate zirconium, and zirconium oxide; yttrium compounds such as yttrium oxide; gallium compounds such as gallium oxide, or the like. Any one of the above or a mixture of two or more of the above may be used as the sintering aid.

The sintering aid may be used in an amount of 0.2 parts by weight to 2 parts by weight, more specifically, 0.4 parts by weight to 1.4 parts by weight, with respect to the total weight of the precursor.

A moisture-removing agent may be selectively further added during the sintering process. Specifically, examples of the moisture-removing agent may include citric acid, tartaric acid, glycolic acid, maleic acid, or the like, and any one of the above or a mixture of two or more of the above may be used as the moisture-removing agent. The moisture-removing agent may be used in an amount of 0.01 to 2 parts by weight with respect to the total weight of the precursor.

The positive electrode active material manufactured by the above process may facilitate intercalation and deintercalation of lithium due to its unique structure described above, may allow high speed lithium movement, and may exhibit excellent structural stability. As a result, resistance may be decreased and output and lifespan characteristics may be improved when applied to a battery. Also, the distribution of metal elements in the positive electrode active material may be further controlled, and as a result, thermal stability may be improved, and performance deterioration at high voltage may be minimized.

Accordingly, according to still another embodiment of the present invention, a positive electrode and a lithium secondary battery including the above-described positive electrode active material are provided.

Specifically, the positive electrode includes a positive electrode current collector and a positive electrode active material layer formed on the positive electrode current collector and including the above-described positive electrode active material.

The positive electrode current collector is not particularly limited as long as the positive electrode current collector does not cause a chemical change to a battery and has conductivity, and for example, stainless steel, aluminum, nickel, titanium, calcined carbon, or an aluminum or stainless steel whose surface is treated with carbon, nickel, titanium, silver, or the like may be used as the positive electrode current collector. Generally, the positive electrode current collector may have a thickness of 3 to 500 µm, and an adhesive force of a positive electrode active material may be improved by forming fine irregularities on a surface of the current collector. For example, the positive electrode current collector may be used in various forms such as a film, a sheet, a foil, a net, a porous body, a foam body, and a nonwoven fabric body.

In addition to the above-described positive electrode active material, the positive electrode active material layer may include a conductive material and a binder.

Here, the conductive material is used to impart conductivity to an electrode, and in a constituted battery, any conductive material can be used without particular limitations as long as the conductive material does not cause a chemical change and has electronic conductivity. Specific examples include graphite such as natural graphite or artificial graphite; a carbon-based material such as carbon black, acetylene black, Ketjen black, channel black, furnace black, lamp black, summer black, and carbon fiber; metal powder or metal fiber such as copper, nickel, aluminum, and silver; conductive whisker such as zinc oxide and potassium titanate; a conductive metal oxide such as titanium oxide; a conductive polymer such as a polyphenylene derivative, or the like, and any one or a mixture of two or more selected therefrom may be used as the conductive material. Generally, the conductive material may be included at 1 to 30 wt % with respect to a total weight of the positive electrode active material layer.

The binder performs a role of improving adhesion between positive electrode active material particles and an adhesive force between the positive electrode active material and the current collector. Specific examples thereof include polyvinylidene fluoride (PVDF), a PVDF-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluororubber, or various copolymers thereof, and one or a mixture of two or more selected therefrom may be used as the binder. The binder may be included at 1 to 30 wt % with respect to the total weight of the positive electrode active material layer.

Except for use of the above-described positive electrode active material, the positive electrode may be manufactured in accordance with a general method of manufacturing a positive electrode. Specifically, the positive electrode may be manufactured by applying a composition for forming a positive electrode active material layer that includes the above-described positive electrode active material and selectively includes the binder and the conductive material on the positive electrode current collector and then drying and rolling. Here, the types and contents of the positive electrode active material, the binder, and the conductive material are the same as those described above.

A solvent may be a solvent that is generally used in the art, examples of the solvent may include dimethyl sulfoxide (DMSO), isopropyl alcohol, N-methyl pyrrolidone (NMP), acetone, or water, and one or a mixture of two or more selected therefrom may be used as the solvent. A use amount of the solvent is sufficient as long as the solvent has a viscosity capable of allowing the positive electrode active material, the conductive material, and the binder to be dissolved or dispersed and exhibiting excellent thickness uniformity when applied layer for manufacturing a positive electrode in consideration of a thickness of an applied slurry and a manufacturing yield.

With another method, the positive electrode may be manufactured by casting the composition for forming the positive electrode active material layer on a separate support body and then laminating a film obtained by separation from the support body on the positive electrode current collector.

According to still another embodiment of the present invention, an electrochemical device including the positive electrode is provided. Specifically, the electrochemical device may be a battery, a capacitor, and the like, and more specifically, may be a lithium secondary battery.

Specifically, the lithium secondary battery includes a positive electrode, a negative electrode disposed opposite the positive electrode, a separator interposed between the positive electrode and the negative electrode, and an electrolyte, and the positive electrode is the same as that described above. Also, the lithium secondary battery may selectively further include a battery container configured to store an electrode assembly including the positive electrode, the negative electrode, and the separator, and a sealing member configured to seal the battery container.

In the lithium secondary battery, the negative electrode includes a negative electrode current collector and a negative electrode active material layer disposed on the negative electrode current collector.

The negative electrode current collector is not particularly limited as long as the negative electrode current collector does not cause a chemical change to a battery and has high conductivity, and for example, copper, stainless steel, aluminum, nickel, titanium, calcined carbon, or a copper or stainless steel whose surface is treated with carbon, nickel, titanium, silver, and the like, an aluminum-cadmium alloy etc. may be used as the negative electrode current collector. Generally, the negative electrode current collector may have a thickness of 3 to 500 µm, and, like the positive electrode current collector, an adhesive force of a negative electrode active material may be improved by forming fine irregularities on a surface of the current collector. For example, the negative electrode current collector may be used in various forms such as a film, a sheet, a foil, a net, a porous body, a foam body, and a nonwoven fabric body.

In addition to the above-described negative electrode active material, the negative electrode active material layer may selectively include a conductive material and a binder. As an example, the negative electrode active material layer may be manufactured by applying a composition for forming a negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

A compound capable of reversible intercalation and deintercalation of lithium may be used as the negative electrode active material. Specific examples include a carbonaceous material such as artificial graphite, natural graphite, graphitized carbon fiber, and amorphous carbon; a metallic compound capable of being formed into an alloy with lithium, such as Si, Al, Sn, Pb, Zn, Bi, In, Mg, Ga, Cd, an Si-alloy, an Sn-alloy, and an Al-alloy; a metal oxide capable of doping and dedoping lithium, such as $SiO_x$ ($0<x<2$), $SnO_2$, vanadium oxide, and lithium vanadium oxide; or a composite including the metallic compound and the carbonaceous material, such as an Si—C compound or an Sn—C compound, and one or a mixture of two or more selected therefrom may be used as the negative electrode active material. Also, a metal lithium thin film may be used as the negative electrode active material. Both low crystalline carbon and high crystalline carbon may be used as the carbon material. Soft carbon and hard carbon are typical low crystalline carbon, and high-temperature calcined carbons such as amorphous, plate-shaped, flake-shaped, spherical, or fiber type natural graphite or artificial graphite, Kish graphite, pyrolytic carbon, mesophase pitch based carbon fiber, meso-carbon microbeads, mesophase pitches, and petroleum or coal tar pitch derived cokes are typical high crystalline carbon.

Also, the binder and the conductive material may be the same as those described above with respect to the positive electrode.

In the lithium secondary battery, the separator separates the negative electrode and the positive electrode and provides a movement path for lithium ions, and anything that is generally used as a separator in a lithium secondary battery may be used without particular limitation. Particularly, it is preferable that the separator have low resistance with respect to ion movement in an electrolyte and have excellent ability of impregnating an electrolyte. Specifically, a porous polymer film, for example, a porous polymer film made of a polyolefin-based polymer such as an ethylene homopolymer, a propylene homopolymer, an ethylene-butene copolymer, an ethylene-hexene copolymer, and an ethylene-methacrylate copolymer or a stacked structure of two or more layers thereof may be used. Also, a general porous nonwoven fabric, for example, a nonwoven fabric formed of high-melting-point glass fiber, polyethylene terephthalate fiber, or the like may be used. A coated separator including a ceramic component or a polymer material for securing heat resistance or mechanical strength may be used, and may be used in a single-layer or multi-layer structure.

Examples of an electrolyte used in the present invention may include an organic liquid electrolyte, an inorganic liquid electrolyte, a solid polymer electrolyte, a gel-type polymer electrolyte, an inorganic solid electrolyte, and a molten-type inorganic electrolyte, which can be used in the manufacture of a lithium secondary battery, but the present invention is not limited thereto.

Specifically, the electrolyte may include an organic solvent and a lithium salt.

Anything that can serve as a medium capable of moving ions that are involved in an electrochemical reaction of a battery can be used as the organic solvent without particular limitation. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethylcarbonate (DMC), diethylcarbonate (DEC), methylethylcarbonate (MEC), ethylmethylcarbonate (EMC), ethylene carbonate (EC), and propylene carbonate (PC); an alcohol-based solvent such as ethyl alcohol and isopropyl alcohol; nitriles such as R-CN (R is a linear, branched, or cyclic hydrocarbon group of C2 to C20, and may include a double bond aromatic ring or an ether bond); amides such as dimethylformamide; dioxolanes such as 1.3-dioxolane; or sulfolane may be used as the organic solvent. Among these, the carbonate-based solvent is preferable, and a mixture of a cyclic carbonate (for example, EC or PC) having high ion conductivity and a high dielectric constant capable of improving the charge/discharge performance of a battery and a linear carbonate-based compound (for example, EMC, DMC, or DEC) having a low viscosity is more preferable. In this case, excellent performance of an electrolyte may be exhibited when the cyclic carbonate and the chain carbonate are mixed in a volume ratio of about 1:1 to 1:9 and used.

Any compound capable of providing lithium ions used in a lithium secondary battery may be used as the lithium salt without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in the range of 0.1 to 2.0M. When the concentration of the lithium salt is within the above range, because the electrolyte has an appropriate conductivity and viscosity, the electrolyte can exhibit excellent electrolyte performance, and the lithium ions can effectively move.

For purposes of improving a lifespan characteristic of a battery, suppressing a decrease in battery capacity, improving a discharge capacity of a battery, and the like, for example, the electrolyte may further include one or more additives such as haloalkylene carbonate-based compound such as difluoroethylene carbonate or the like, pyridine, triethyl phosphite, triethanolamine, cyclic ether, ethylenediamine, n-glyme, hexaphosphate triamide, a nitrobenzene derivative, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, or the like in addition to the components of the electrolyte. Here, the additive may be included at 0.1 to 5 wt % with respect to the total weight of the electrolyte.

Because the lithium secondary battery including the positive electrode active material according to the present invention stably exhibits an excellent discharge capacity, output characteristic, and capacity retention as described above, the lithium secondary battery is useful for portable devices such as a mobile phone, a laptop computer, and a digital camera and in the electric vehicle field including a hybrid electric vehicle (HEV).

Accordingly, according to another embodiment of the present invention, a battery module including the lithium secondary battery as a unit cell and a battery pack including the same are provided.

The battery module or battery pack may be used as a power source of a medium to large sized device of one or more of a power tool; an electric car including an electric vehicle (EV), a hybrid electric vehicle, and a plug-in hybrid electric vehicle (PHEV); or a power storage system.

According to yet another embodiment of the present invention, a precursor that is useful in manufacturing the positive electrode active material is provided.

Specifically, the precursor is a secondary particle including a primary particle, and the primary particle may include the compound of Formula 2 below and have a needle shape.

$$Ni_{1-x-y}Co_xM1_yM3_zM2_wA \qquad \text{[Formula 2]}$$

(In Formula 2, A is a hydroxy group or an oxyhydroxy group, M1 is at least one selected from the group consisting of Al and Mn, M2 is any one or two or more elements selected from the group consisting of Zr, Ti, Mg, Ta, and Nb, M3 is any one or two or more elements selected from the group consisting of W, Mo, and Cr, and 0<x≤0.5, 0<y≤0.5, 0.002≤z≤0.03, 0≤w≤0.02, 0<x+y≤0.7) Other features of the precursor are the same as those described above.

MODE

Hereinafter, an embodiment of the present invention will be described in detail so that one of ordinary skill in the art to which the present invention pertains can easily practice the present invention. However, the present invention may be implemented in various other forms and is not limited to the embodiment described herein.

Example 1: Preparation of Positive Electrode Active Material

In a batch-type 5 L reactor set at 60° C., nickel sulfate, cobalt sulfate, and manganese sulfate were mixed in a molar ratio of 60:20:20 in water to prepare a metal-containing solution at a concentration of 2M. A vessel containing the metal-containing solution was connected to enter the reactor, and a 4M NaOH solution and a NH₄OH aqueous solution at a concentration of 7% were prepared and connected to the reactor, respectively. 3 L of deionized water was added to a coprecipitation reactor (capacity: 5 L), the reactor was purged with nitrogen gas at a rate of 2 L/min to remove oxygen dissolved in water, and a non-oxidizing atmosphere was formed in the reactor. Then, 100 ml of 4M NaOH was added thereto, and the mixture was maintained at pH 9.5 at a stirring speed of 1,200 rpm at 60° C. Then, the metal-containing solution, the NaOH aqueous solution, and the NH₄OH aqueous solution were added at 180 ml/hr, 180 ml/hr, and 10 ml/hr, respectively and reacted for 24 hours to form a nickel-manganese-cobalt-based composite metal hydroxide.

A particle of the nickel-manganese-cobalt-based composite metal hydroxide formed as a result was mixed with lithium hydroxide as a lithium raw material and tungsten oxide in a molar ratio of 1:1.07:0.02 and then heat-treated for 10 hours at 820° C. under an oxygen atmosphere (oxygen partial pressure 20%) to manufacture the positive electrode active material.

Example 2: Preparation of Positive Electrode Active Material

In a batch-type 5 L reactor set at 60° C., nickel sulfate, cobalt sulfate, and manganese sulfate were mixed in a molar ratio of 70:15:15 in water to prepare a first metal-containing solution at a concentration of 2M, and nickel sulfate, cobalt sulfate, and manganese sulfate were mixed in a molar ratio of 60:20:20 in water to prepare a second metal-containing solution at a concentration of 2M. A vessel containing the first metal-containing solution was connected to enter the reactor, and a vessel containing the second metal-containing solution was connected to enter the first metal-containing solution vessel. In addition, a 4M NaOH solution and a NH₄OH aqueous solution at a concentration of 7% were prepared and connected to the reactor, respectively.

3 L of deionized water was added to a coprecipitation reactor (capacity: 5 L), the reactor was purged with nitrogen gas at a rate of 2 L/min to remove oxygen dissolved in water, and a non-oxidizing atmosphere was formed in the reactor. Then, 100 ml of 4M NaOH was added thereto, and the mixture was maintained at pH 9.5 at a stirring speed of 1,200 rpm at 60° C. Then, the first metal-containing solution, the NaOH aqueous solution, and the NH₄OH aqueous solution were added at 180 ml/hr, 180 ml/hr, and 10 ml/hr, respectively and reacted for 30 minutes to form a seed of lithium-nickel-manganese composite metal hydroxide. Then, the second metal-containing solution was added to the first metal-containing solution vessel at 150 ml/hr to induce the growth of the hydroxide particle and simultaneously induce the formation of a concentration gradient inside the particle. Then, the reaction was maintained for 24 hours to grow a nickel-manganese-cobalt-based composite metal hydroxide.

A particle of the nickel-manganese-cobalt-based composite metal hydroxide formed as a result was mixed with lithium hydroxide as a lithium raw material and tungsten oxide in a molar ratio of 1:1.07:0.02 and then heat-treated for 10 hours at 820° C. under an oxygen atmosphere (oxygen partial pressure 20%) to manufacture a positive electrode active material distributed with a concentration gradient in which a concentration of Ni gradually increases toward a particle surface and concentrations of Co and Mn gradually decrease toward the particle surface in the active material particle.

Example 3: Preparation of Positive Electrode Active Material

The positive electrode active material was manufactured using the same method as in Example 1 except using molybdenum oxide instead of tungsten oxide.

Example 4: Preparation of Positive Electrode Active Material

The positive electrode active material was manufactured using the same method as in Example 1 except for the use of chromium oxide instead of tungsten oxide.

Comparative Example 1: Preparation of Positive Electrode Active Material

In a batch-type 5 L reactor set at 60° C., nickel sulfate, cobalt sulfate, and manganese sulfate were mixed in a molar ratio of 60:20:20 in water to prepare a metal-containing solution at a concentration of 2M. A vessel containing a first metal-containing solution was connected to enter the reactor, and a 4M NaOH solution and a NH$_4$OH aqueous solution at a concentration of 7% were prepared and connected to the reactor, respectively. 3 L of deionized water was added to a coprecipitation reactor (capacity: 5 L), the reactor was purged with nitrogen gas at a rate of 2 L/min to remove oxygen dissolved in water, and a non-oxidizing atmosphere was formed in the reactor. Then, the mixture was maintained at pH 12.0 at a stirring speed of 1,200 rpm at 60° C. Then, the metal-containing solution, the NaOH aqueous solution, and the NH$_4$OH aqueous solution were added at 180 ml/hr, 180 ml/hr, and 10 ml/hr, respectively and reacted for 24 hours to form a nickel-manganese-cobalt-based composite metal hydroxide.

A particle of the nickel-manganese-cobalt-based composite metal hydroxide formed as a result was mixed with lithium hydroxide as a lithium raw material and tungsten oxide in a molar ratio of 1:1.07:0.2 and then heat-treated for 10 hours at 820° C. under an air atmosphere to manufacture the positive electrode active material.

Comparative Example 2: Preparation of Positive Electrode Active Material

The positive electrode active material was manufactured using the same method as in Comparative Example 1 except for mixing the nickel-manganese-cobalt-based composite metal hydroxide, the lithium hydroxide, and the tungsten oxide in a molar ratio of 1:1.07:0.04.

Comparative Example 3: Preparation of Positive Electrode Active Material

The positive electrode active material was manufactured using the same method as in Comparative Example 1 except for not using the tungsten oxide.

Preparation Example: Preparation of Lithium Secondary Battery

A lithium secondary battery was manufactured using each of the positive electrode active materials manufactured in Examples 1 and 2.

Specifically, each of the positive electrode active materials manufactured in Examples 1 and 2, carbon black which is a conductive material, and PVDF which is a binder were mixed in a weight ratio of 95:2.5:2.5 in an N-methyl pyrrolidone (NMP) as a solvent to manufacture a composition for forming a positive electrode (viscosity: 5,000 mPa·s), and the composition was applied on an aluminum current collector, dried at 130° C., and rolled to manufacture a positive electrode.

Also, natural graphite as a negative electrode active material, carbon black as a conductive material, and PVDF as a binder were mixed in a weight ratio of 85:10:5 in NMP as a solvent to manufacture a composition for forming a negative electrode, and the composition was applied on a copper current collector to manufacture a negative electrode.

A porous polyethylene separator was interposed between the positive electrode and the negative electrode manufactured as above to manufacture an electrode assembly, the electrode assembly was placed inside a case, and then an electrolyte was injected into the case to manufacture a lithium secondary battery. Here, the electrolyte was manufactured by dissolving lithium hexafluorophosphate (LiPF$_6$) at a concentration of 1.0M in an organic solvent consisting of EC/DMC/EMC in a volume mixing ratio of 3:4:3.

Experimental Example 1: Observation of Precursor and Positive Electrode Active Material Each of the positive electrode active materials manufactured in Example 1 to Example 4 and Comparative Example 1 to Comparative Example 3 was observed with an SEM, and results thereof are shown in FIGS. 1 to 7.

Figure 2:
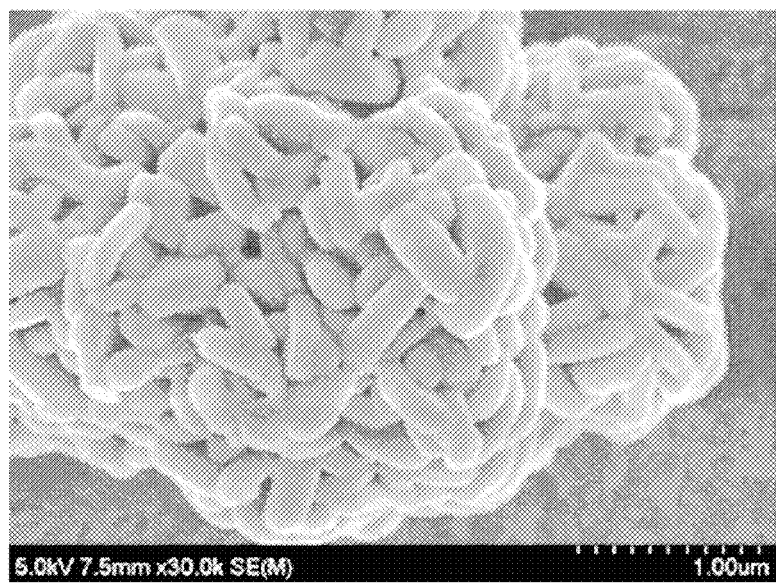
FIG. 2 is a photograph of a positive electrode active material of Example 2 observed with the SEM.
Figure 3:
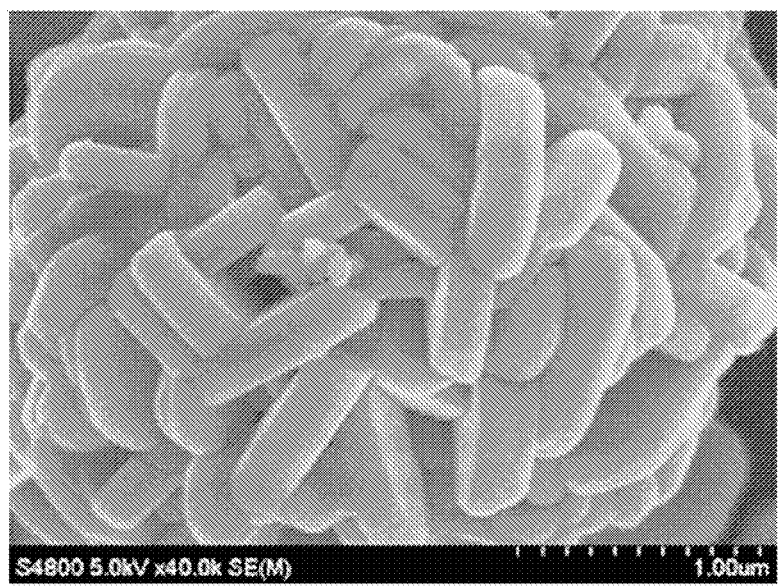
FIG. 3 is a photograph of a positive electrode active material of Example 3 observed with the SEM.
Figure 4:
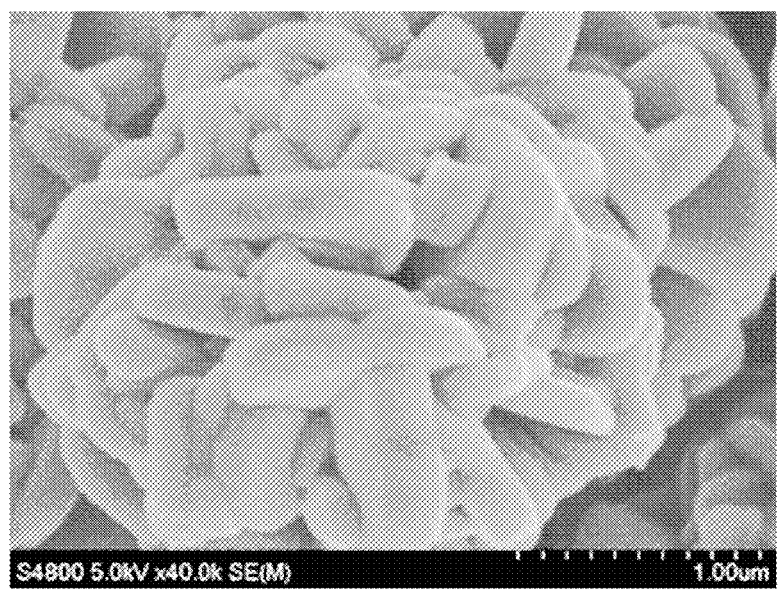
FIG. 4 is a photograph of a positive electrode active material of Example 4 observed with the SEM.
Figure 5:
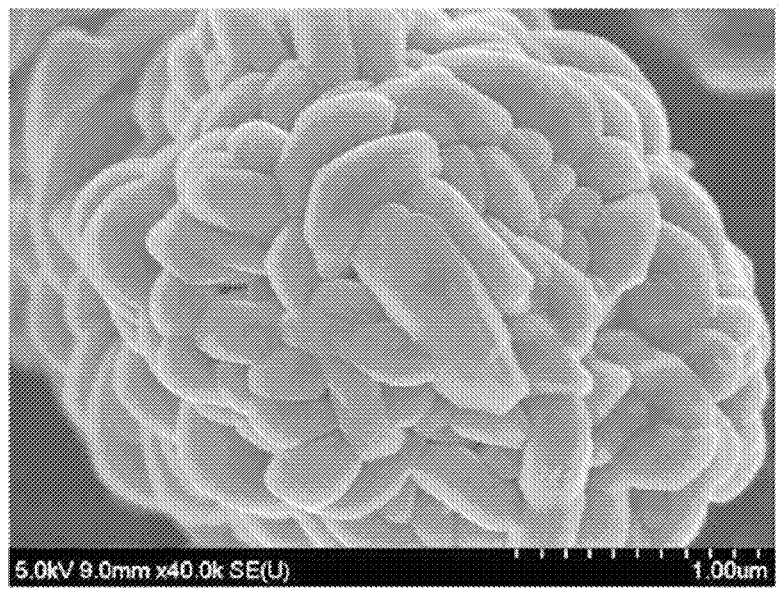
FIG. 5 is a photograph of a positive electrode active material of Comparative Example 1 observed with the SEM.
Figure 6:
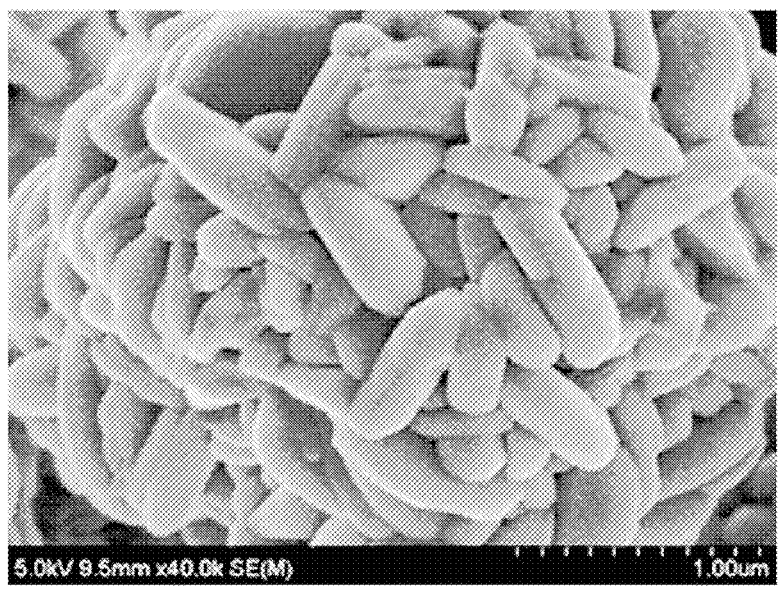
FIG. 6 is a photograph of a positive electrode active material of Comparative Example 2 observed with the SEM.
Figure 7:
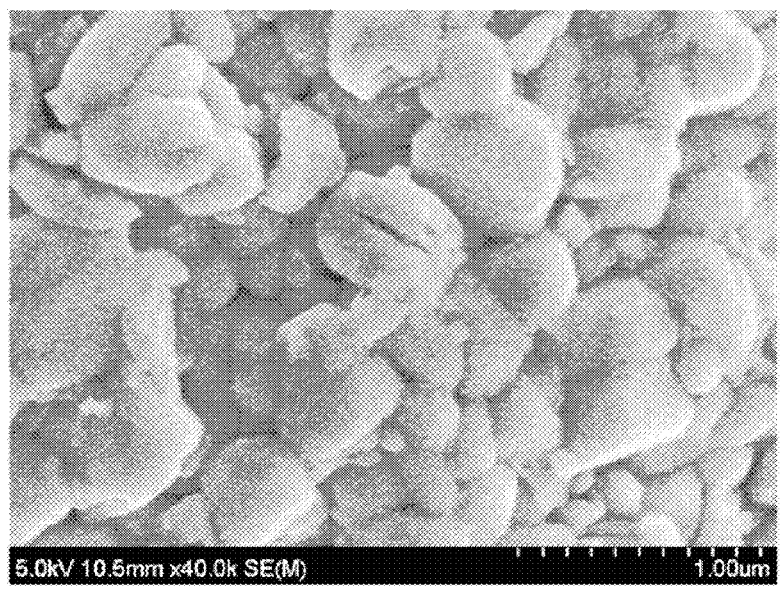
FIG. 7 is a photograph of a positive electrode active material of Comparative Example 3 observed with the SEM.

FIG. 1 is a photograph of a positive electrode active material manufactured in Example 1 observed with the SEM, FIG. 2 is a photograph of a positive electrode active material manufactured in Example 2 observed with the SEM, FIG. 3 is a photograph of a positive electrode active material manufactured in Example 3 observed with the SEM, FIG. 4 is a photograph of a positive electrode active material manufactured in Example 4 observed with the SEM, FIG. 5 is a photograph of a positive electrode active material manufactured in Comparative Example 1 observed with the SEM, FIG. 6 is a photograph of a positive electrode active material manufactured in Comparative Example 2 observed with the SEM, and FIG. 7 is a photograph of a positive electrode active material manufactured in Comparative Example 3 observed with the SEM.

As a result, it was confirmed that each of the positive electrode active materials manufactured according to Example 1 to Example 4 was a secondary particle in which primary particles (aspect ratio=2.5) having a rectangular parallelepiped shape, the rectangular parallelepiped having all vertices and edges formed in a round shape that is convex outward, are entangled. Conversely, although each of the positive electrode active materials manufactured according to Comparative Example 1 to Comparative Example 3 was a secondary particle in which primary particles are entangled, it was confirmed that the primary particles had irregular forms that are difficult to be specified and pores on a surface of the secondary particle were considerably smaller in comparison to Example 1.

Figure 8:
FIG. 8 is a photograph of a cross-section of the positive electrode active material of Example 1 observed with the SEM.
Figure 9:
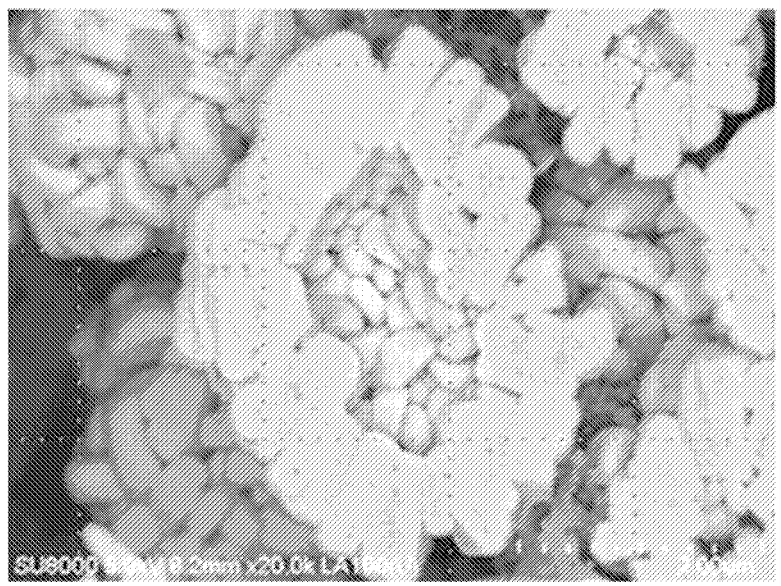
FIG. 9 is a photograph of a cross-section of the positive electrode active material of Comparative Example 1 observed with the SEM.

Cross-sections of the positive electrode active materials manufactured in Example 1 and Comparative Example 1 were observed with the SEM, and results thereof are shown in FIGS. 8 and 9.

As a result, it was confirmed that both of the positive electrode active materials in Example 1 and Comparative Example 1 had a hollow therein, and a volume of the hollow was 30 vol % in the case of Example 1 and 35 vol % in the case of Comparative Example 1 with respect to the total volume of the secondary particle.

Some of the primary particles, about 10% of the total primary particles, constituting the positive electrode active material were confirmed to be oriented in a central direction of the active material in the case of the positive electrode active material manufactured according to Example 1, whereas primary particles were confirmed to be entangled without orientation in the case of the positive electrode active material of Comparative Example 1. Also, in the positive electrode active material manufactured according to Example 1, the primary particles were confirmed as having a rectangular cross-section.

Figure 10:
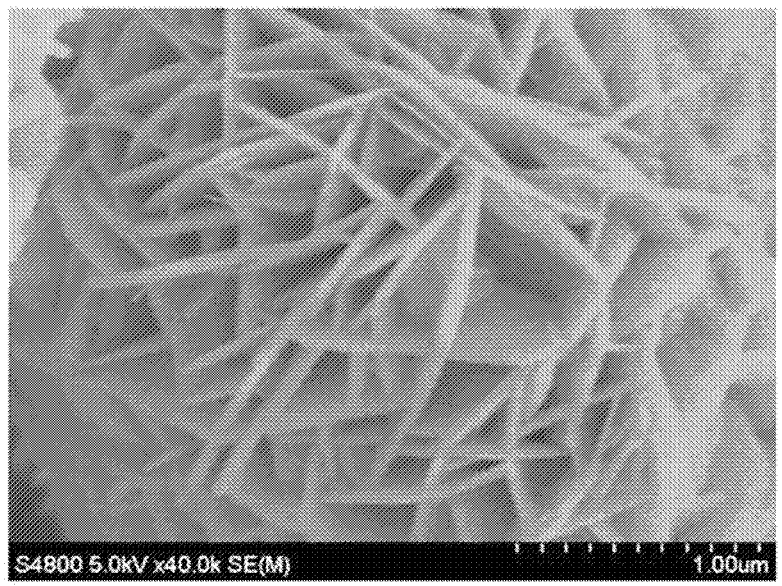
FIG. 10 is a photograph of a precursor of the positive electrode active material of Example 1 observed with the SEM.

A precursor of the positive electrode active material manufactured in Example 1 was observed with the SEM. A result thereof is shown in FIG. 10.

As a result, it is possible to confirm the formation of a needle-shaped precursor. When looking at a photograph of the positive electrode active material of FIG. 1, it may be recognized that the needle-shaped precursor is changed into a rectangular parallelepiped shape with a vertex portion that is rounded to be convex outward during a subsequent sintering process.

Experimental Example 2: Analysis of Positive Electrode Active Material

Open porosity of each of the positive electrode active materials manufactured in Examples 1 to 4 and Comparative Examples 1 to 3 was measured according to a method below, and a result thereof is shown in Table 1. Also, an average particle size, a specific surface area, and a tap density of each of the positive electrode active materials manufactured in Examples 1 and 2 and Comparative Example 1 were measured according to a method below, and a result thereof is shown in Table 2. (1) Open porosity: The positive electrode active material was cut using the FIB, a cross-sectional image was acquired by the SEM, the acquired cross-sectional image was divided into a spatial portion and a material portion by computer image processing, and open porosity was calculated according to Equation 1 below.

Open porosity=(Surface area of open pore portion/Surface area of secondary particle)×100   [Equation 1]

(2) Average particle size ($D_{50}$): The positive electrode active material particle was introduced into a commercially available laser diffraction particle size measurement device (for example, Microtrac MT 3000), and then an ultrasonic wave of about 28 kHz was radiated with an output of 60 W to calculate the average particle size ($D_{50}$) based on a particle size distribution at 50% in the measurement device.

(3) BET specific surface area ($m^2/g$): the specific surface area of the positive electrode active material was measured using the BET method, and specifically, the specific surface area was calculated from a nitrogen gas absorption amount at a liquid nitrogen temperature (77K) using BELSORP-mini II of BEL Japan company.

(4) Tap density (g/cc): the tap density was measured using a tap density measuring device (Tap-2S of Logan company).

TABLE 1

| Type | Example 1 | Example 2 | Example 3 | Example 4 | Comparative Example 1 | Comparative Example 2 | Comparative Example 3 |
| --- | --- | --- | --- | --- | --- | --- | --- |
| Open porosity (%) | 16 | 22 | 19 | 28 | 5 | 12 | 6 |

TABLE 2

| Type | Example 1 | Example 2 | Comparative Example 1 |
| --- | --- | --- | --- |
| Average particle size ($D_{50}$) (μm) | 5.5 | 5.1 | 6.7 |
| BET specific surface area ($m^2/g$) | 0.70 | 0.87 | 0.23 |
| Tap density (g/cc) | 1.90 | 1.71 | 2.03 |

Experimental Example 3: Evaluation of Positive Electrode Active Material

A coin cell (using a Li metal negative electrode) manufactured using each of the positive electrode active materials manufactured in Example 1 and Comparative Example 1 was charged at a constant current (CC) of 0.1 C until 4.25 V at 25° C., and then charging at a constant voltage (CV) of 4.25V was performed, thereby performing one-time charging until a charging current reaches 0.05 mAh. Then, the coin cell was left for 20 minutes and then discharged until 3.0 V at the constant current of 0.1 C to measure a first-cycle discharge capacity. Then, each of charge/discharge capacity, charge/discharge efficiency, and rate capability was evaluated after changing a discharge condition to 2 C. A result thereof is shown in Table 3 below.

TABLE 3

| | First charge/discharge | | | 2 C rate | |
| --- | --- | --- | --- | --- | --- |
| Type | Charge capacity (mAh/g) | Discharge capacity (mAh/g) | Charge/discharge efficiency (%) | Capacity (mAh/g) | 2.0 C/0.1 C (%) |
| Example 1 | 190.2 | 178.0 | 93.6 | 156.9 | 88.5 |
| Comparative Example 1 | 189.7 | 175.3 | 92.4 | 150.4 | 85.5 |

As a result of the experiments, it was confirmed that a battery including the positive electrode active material of Example 1 exhibits a superior capacity characteristic and superior charge/discharge efficiency and exhibits an improved effect also in terms of rate capability in comparison to a battery including the positive electrode active material of Comparative Example 1.

The invention claimed is:

1. A positive electrode active material for a secondary battery, the positive electrode active material being a secondary particle that includes a primary particle having a rectangular parallelepiped shape, the rectangular parallelepiped having at least one portion of vertices and edges formed in a round shape that is convex outward, wherein:

1% to 40% of a total surface area of the secondary particle has open porosity; and the primary particle includes a lithium composite metal oxide of Formula 1 below:

$Li_aNi_{1-x-y}Co_xM1_yM3_zM2_wO_2$   [Formula 1]

(In Formula 1, M1 is at least one selected from the group consisting of Al and Mn, M2 is any one or two or more elements selected from the group consisting of Zr, Ti, Mg, Ta, and Nb, M3 is any one or two or more elements selected from the group consisting of W, and Mo, and 1.0≤a≤1.5, 0<x≤0.5, 0<y≤0.5, 0.002≤z≤0.03, 0≤w≤0.02, 0<x+y≤0.7).

2. The positive electrode active material of claim 1, wherein:

the primary particle has a rectangular parallelepiped shape in which at least one vertex portion of vertices of the rectangular parallelepiped has a round shape that is convex outward; and a cross-section of the primary particle is rectangular when the particle is cut such that the rectangular parallelepiped includes a long axis that is parallel to two surfaces of the rectangular parallelepiped facing each other and passes through a center of the particle.

3. The positive electrode active material of claim 1, wherein an aspect ratio of the primary particle which is a ratio between a long axis passing through the center of the primary particle and a short axis orthogonal to the long axis and passing through the center of the primary particle is 1.5 to 10.

4. The positive electrode active material of claim 1, wherein less than 50% of the primary particles have an orientation oriented toward a center of the secondary particle.

5. The positive electrode active material of claim 1, wherein the positive electrode active material further comprises a hollow inside the secondary particle.

6. The positive electrode active material of claim 1, wherein at least one metal element of nickel, M1, and cobalt exhibits a concentration gradient that changes in the active material particle.

7. The positive electrode active material of claim 1, wherein:
nickel, M1, and cobalt exhibit a concentration gradient that each independently changes throughout the active material;
the concentration of nickel decreases with a gradual concentration gradient in a direction from the center of the active material toward a surface thereof; and
the concentrations of cobalt and M1 independently increase with a concentration gradient in the direction from the center of the active material toward the surface thereof.

8. The positive electrode active material of claim 1, wherein the M1 is Mn.

9. The positive electrode active material of claim 1, wherein the positive electrode active material has an average particle size ($D_{50}$) of 2 μm to 20 μm and a Brunauer-Emmett-Teller (BET) specific surface area of 0.5 m²/g to 1.9 m²/g.

10. The positive electrode active material of claim 1, wherein the positive electrode active material has a tap density of 1.7 g/cc to 2.5 g/cc.

11. A method of manufacturing the positive electrode active material for a secondary battery according to claim 1, the method comprising:
a step of preparing a needle-shaped precursor by adding an ammonium cation-containing complexing agent and a basic compound to a metal-containing solution, which is produced by mixing a nickel raw material, a cobalt raw material, and an M1 raw material (here, M1 is at least one element selected from the group consisting of Al and Mn), and causing a reaction at pH 9 to 11; and
a step of mixing the needle-shaped precursor with a lithium raw material and then sintering at 700° C. to 900° C.,
wherein an M3 raw material (here, M3 is any one or two or more elements selected from the group consisting of W, Mo, and Cr) is further added when producing the metal-containing solution or mixing the needle-shaped precursor with the lithium raw material.

12. The method of claim 11, wherein the ammonium cation-containing complexing agent includes any one or a mixture of two or more selected from the group consisting of $NH_4OH$, $(NH_4)_2SO_4$, $NH_4NO_3$, $NH_4Cl$, $CH_3COONH_4$, and $NH_4CO_3$.

13. The method of claim 11, wherein the basic compound includes any one or a mixture of two or more selected from the group consisting of a hydrate of an alkali metal, a hydroxide of an alkali metal, a hydrate of an alkaline earth metal, and a hydroxide of an alkaline earth metal.

14. The method of claim 11, wherein the lithium raw material is used such that a molar ratio between lithium included in the lithium raw material and a metal element (Me) included in the precursor (molar ratio of lithium/metal element (Me)) is 1.0 or higher.

15. The method of claim 11, wherein the step of preparing the needle-shaped precursor includes further adding a metal-containing solution including nickel, cobalt, M1, and M3 in different concentrations from the metal-containing solution.

16. The method of claim 11, wherein, when producing the metal-containing solution or mixing the needle-shaped precursor with the lithium raw material, an M2 raw material (here, M2 is any one or two or more elements selected from the group consisting of Zr, Ti, Mg, Ta, and Nb) is further added.

17. A positive electrode for a secondary battery including the positive electrode active material of claim 1.

18. A lithium secondary battery comprising the positive electrode of claim 17.

* * * * *